US 6,667,934 B1

(12) United States Patent
Healey

(10) Patent No.: US 6,667,934 B1
(45) Date of Patent: Dec. 23, 2003

(54) DIGITAL SONAR TRANSDUCER

(75) Inventor: Robert W. Healey, Tulsa, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/224,813

(22) Filed: Aug. 21, 2002

(51) Int. Cl.[7] ................................................. H04B 7/14

(52) U.S. Cl. ............................................................ 367/4

(58) Field of Search ................................ 367/4, 96, 111

(56) References Cited

U.S. PATENT DOCUMENTS

| 4,757,481 A | * | 7/1988 | Orr et al. ........................ 367/96 |
| 4,901,291 A | * | 2/1990 | Kurata ........................... 367/111 |

OTHER PUBLICATIONS

Airmar Technology Corporation, No. 17–233–01, "Introduces the Future in Marine Sensor Technology Smart Sensors With Embedded Signal Processing", (2002).

* cited by examiner

Primary Examiner—Daniel T. Pihulic
(74) Attorney, Agent, or Firm—Fellers, Snider, Blankenship, Bailey & Tippens, P.C.

(57) ABSTRACT

A sonar system, and a digital sonar transducer for use with the inventive system, in which transmitter and receiver circuitry are remote to the sonar display unit. In a preferred embodiment the digital sonar transducer includes: a housing; an acoustic transducer housed within the housing; transmitter circuitry for driving the acoustic transducer; receiver circuitry for conditioning received echos; and a computing device for receiving commands from a display unit, processing received echos, and sending echo information to the display unit. The display unit of the inventive system is configured to receive echo information from the digital sonar transducer and display sonar information to an operator.

7 Claims, 2 Drawing Sheets

DIGITAL SONAR TRANSDUCER

BACKGROUND OF THE INVENTION

1. Field of the Invention

The present invention relates to a sonar transducer. More particularly, but not by way of limitation, the present invention relates to a digital sonar transducer which includes circuitry for firing a sonar pulse and receiving sonar echos.

2. Background of the Invention

Sonar devices are well known in the art and find widespread use in sport fishing, navigation, scuba diving, as well as any number of other recreational or commercial activities. Typically, a sonar system will include a sonar unit, which includes a display for providing information to the operator, and a transducer which is mounted under the waterline for generating an ultrasonic pulse and receiving echoes from objects in the water, or the bottom surface. The electronic circuitry for driving the transducer to transmit an acoustic pulse and for amplifying and filtering received echoes has traditionally been located in the sonar unit. Locating such circuitry in the sonar unit has, heretofore, provided a number of advantages, such as: there is more likely to be ample room for the circuitry in the sonar unit while the transducer tends to be comparatively small; the environment of the sonar unit is relatively benign, at least when compared to the environment of the transducer; and the cost of replacing a lost or damaged transducer is less when its associated circuitry is located remotely.

In such a system, driver circuitry in the sonar unit produces a pulse consisting of a packet of several cycles of an ultrasonic signal at a fairly high output power. This pulse is delivered to the transducer via a coaxial transmission line. After transmission of the sonar pulse, the transducer is typically used to "listen" for echoes. Received echoes produce very small signals, on the order of a few millivolts, which are sent via the coaxial transmission line to receiver circuitry in the sonar unit. In the sonar unit, the received echoes are amplified, filtered, and analyzed.

Thus, a great deal of momentum has been built around placement of the sonar transceiver circuitry into the sonar unit and, indeed, existing sonar systems, have served the sport fishing industry well. However, the evolution of other boating systems, as well as the advancement of sonar technology, have altered the equation to the point where the advantages associated with placing transceiver circuitry within the transducer, and the problems associated with the traditional method, far outweigh the advantages mentioned above.

First, electromagnetic interference from other systems poses a significant problem for sonar systems. As previously mentioned, echoes received by the transducer generate very low level signals which must be transmitted through a coaxial cable to the sonar unit. This signal is susceptible to interference from electromagnetic noise, ground noise, radio frequency noise, and the like. Such noise often induces voltages in the cable which interferes with legitimate echo signals. While the received signal may be filtered at the sonar unit to remove much of the unwanted noise, some noise will likely be indistinguishable from legitimate echoes and cannot be removed by filtering. In particular, pulse width modulated trolling motors are notorious for producing large amounts of electromagnetic noise. However, communication systems, engine ignition systems, and other computerized gear may also create significant levels of interference. Eliminating the need to send low level signals from the transducer to the sonar unit could virtually eliminate interference caused by the various sources of noise. Furthermore, transmitting a digital representation of the echo signals could eliminate the effects of noise induced in the cable.

In addition, it is widely accepted that some sonar frequencies are better suited for a particular purpose than other sonar frequencies. While most low and moderately priced sonar units operate at only a single frequency, and some high-end units add a second frequency, recreational sonar units operate at frequencies which represent a compromise designed to serve the sport fisherman reasonably well. Not only does a broader selection of frequencies allow tailoring of a sonar system for a particular environment, it allows multiple units to be used in a small area. Presently, when multiple units operate at a single frequency within a small area, the sonar systems tend to interfere with one another. In contrast, multiple units operating at spaced-apart frequencies can be operated in a small area without significant interference between units.

Finally, wiring between the sonar unit and the transducer has been problematic, often requiring a skill level far beyond that of the typical purchaser of a sonar system. The cabling must be routed to: avoid leaks since the sonar unit is invariably above the water line, inside the boat, while the transducer is invariably below the water line, outside the boat; avoid trip hazzards, especially in environments where tripping could result in a man overboard, and in consideration of the fact that the cables are typically only available in discrete lengths; and to avoid damage to the cable. In addition, fishing boats often have multiple electrical systems for the use of an electric trolling motor which can further complicate wiring considerations.

Recently, sonar transducers having integral transmitter and receiver circuitry have been available. Unfortunately, such transducers have thus far been output-only devices and are not be controllable by a sonar unit. The transducer simply fires at-will and at a predetermined power. The sonar unit cannot adjust the power, repetition rate, duration of the sonar pulse to adjust to the environment or synchronize the sonar output to other devices. In light of environmental factors such as varying reflectivity of different bottom surfaces, and the differences in the demands of the particular uses for a sonar system, i.e. navigation, fish location, searching for objects, etc., the inability to control the transducer output is unacceptable.

Thus it is an object of the present invention to provide a sonar transducer which includes transceiver circuitry within the transducer to alleviate the problems and overcome the limitations discussed above.

SUMMARY OF THE INVENTION

The present invention provides a digital sonar transducer having transmitter, receiver, and computing circuitry associated with the particular transducer located remote to a sonar display unit. In a preferred embodiment, the digital sonar transducer receives commands via a digital input and sends echo information via a digital output. The inventive transducer includes: an acoustic transducer element configured to emit a sonar pulse and to receive sonar echoes; transmitter circuitry for driving the transducer element to generate a sonar pulse; receiver circuitry to amplify and condition received echoes; a computing device to process the echo information and interface circuitry to digitally communicate with a sonar display unit.

In one preferred embodiment, the transducer and its associated receiver and transmitter circuitry are housed within a common, waterproof housing. Like its prior art counterparts, the transducer is secured to the boat below the waterline and wiring is routed to the transducer in an appropriate manner in light of the environment. Unlike prior art transducers, shielded cable is not required to carry the sonar signal.

In another preferred embodiment, the transducer receives commands digitally via the interface, adjusts the power of the transmitter in response to the commands, transmits an acoustic pulse, adjusts the receiver gain, filters and discriminates incoming echoes, and transmits echo information digitally via the interface. Since the input and output signals are digital in nature, they are relatively immune from the effects of electromagnetic, and electrical, noise.

In still another preferred embodiment, the inventive transducer may be made available in an array of different frequencies such that: 1) a recreational sonar may be "tuned" to a particular frequency which is especially well suited for use in a particular environment; and 2) multiple sonar systems may be simultaneously used on a single boat or in a small area in an asynchronous manner without interfering among themselves. Since the resonant element and the driver circuitry are both parts of transducer, there is no need to frequency match a transducer to a particular control unit.

In yet another preferred embodiment, the inventive transducer is provided with a wireless interface to reduce the complexity of wiring the sonar system. Preferably, in such a system, the sonar transducer is battery operated such that no wires need to run through, or over, the hull.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
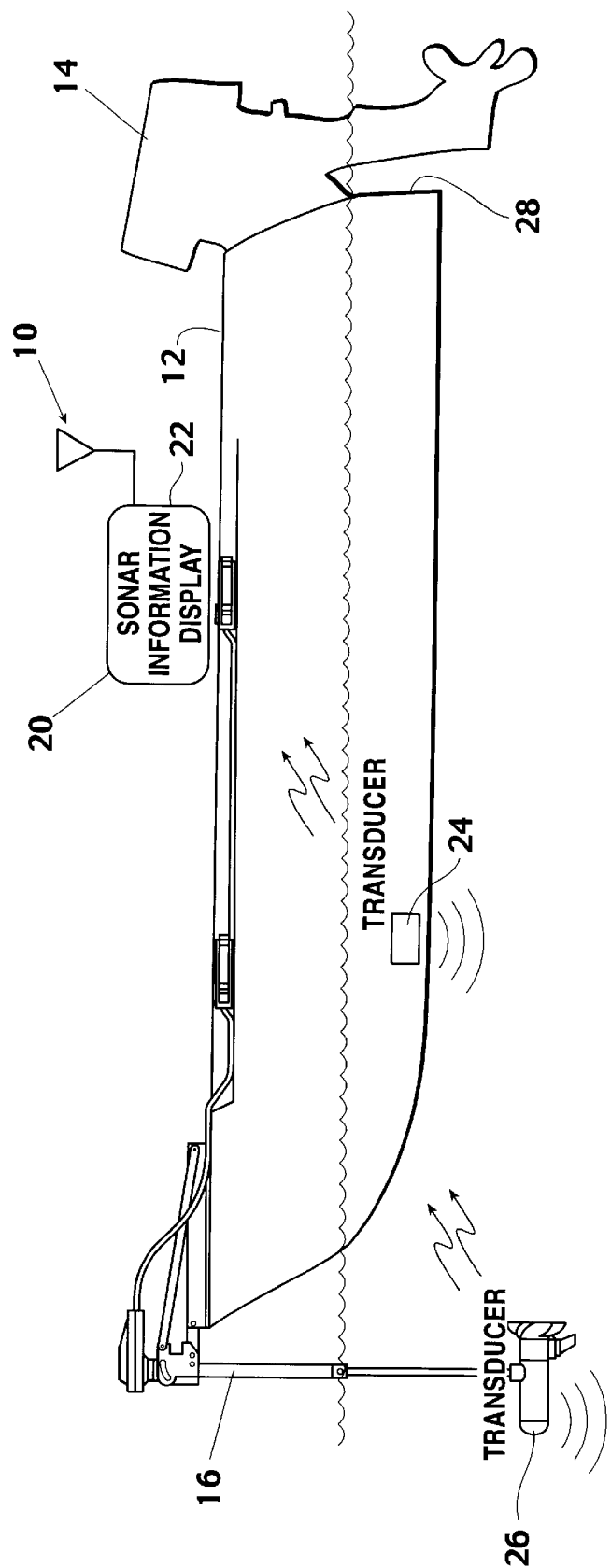
FIG. 1 depicts the inventive sonar system in its general environment.

Referring now to the drawings, wherein like reference numerals indicate the same parts throughout the several views, the inventive sonar system 10 is shown in its general environment in FIG. 1. While sonar systems find widespread use in any number of marine environments, whether recreational, commercial, or military, and, while the inventive sonar system is equally well suited for use in any such environment, the preferred embodiment will be discussed and shown, strictly by way of example and not by way of limitation, in relation to its use in a recreational fishing environment. Thus, a recreational fishing boat 12 is often equipped with: an outboard motor 14 for moving rapidly from area-to-area; a trolling motor 16 for relatively slow movements within a relatively small area, typically while fishing; and a sonar system 10 for locating fish or for navigation. Preferably, the inventive sonar system 10 will include, at a minimum, at least one sonar unit 20 which includes an information display 22, and at least one sonar transducer 24 or 26. Often multiple sonar units are employed, perhaps one sonar unit for navigation, along with additional units placed about the boat such that fishermen can see a sonar display when fishing from any location on the perimeter of the boat.

Traditionally, there have been several options for the placement of a sonar transducer. Hull mount transducers, such as transducer 24, have been very popular, however, wiring of such transducer may be problematic and potentially lead to leaks. The transom 28 has also been a common place to locate a transducer. While it is easier to locate wires for a transom transducer (not shown), the environment tends to be somewhat harsher than hull locations and it may be some distance from areas of the boat 12 which are convenient locations from which to fish.

Another preferred location for a sonar transducer is on a trolling motor, such as the location of transducer 26. This position offers a number of advantages, such as: the transducer wiring may be routed through the trolling motor support column, eliminating the potential for leaks; the trolling motor is usually within fairly close proximity to the fisherman; the trolling motor is typically raised out of the water while the boat is used at higher speeds, reducing the risk of damage to the transducer; etc.

These traditional locations, as well as other locations under the waterline, are also suitable for the inventive digital sonar transducer.

Figure 4:
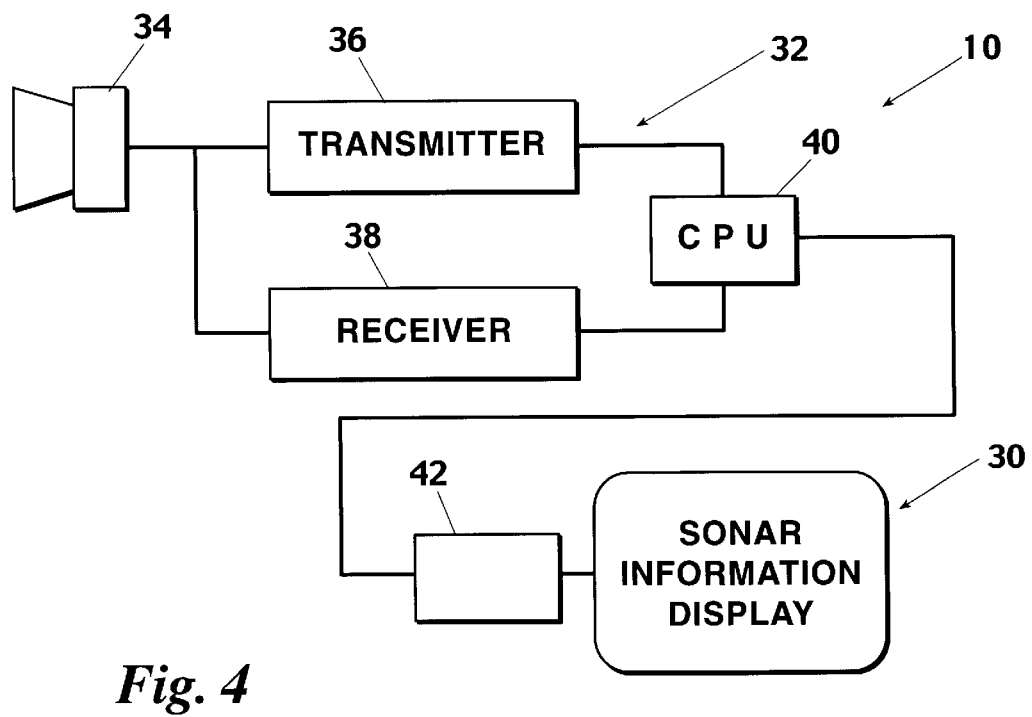
FIG. 4 provides a block diagram of the inventive digital sonar transducer in a hardwired system.

Referring next to FIG. 4, preferably the inventive sonar system 10 includes a display unit 30 and a digital sonar transducer 32. Digital sonar transducer 32 preferably includes: acoustic element or transducer 34; transmitter circuitry 36; receiver circuitry 38 for processing received echoes; and computing device 40. It should be noted that the acoustic transducer 34 is preferably of the type presently used in recreational sonar systems. It should be further noted that the transmitter circuitry 36 is also of the type which is presently found in sonar units, and hence, is also well known in the art. Circuitry 36 may include provisions for selectively adjusting the power output applied to acoustic transducer 34, as well as provisions for adjusting the duration of the sonar pulse, the repetition rate of sonar pulses, triggering of individual pulses on command, for synchronizing multiple transducers as well as control of other transducer parameters.

Receiver circuitry 38 is also of the type presently found in sonar units. Receiver circuitry typically includes an amplifier having variable and/or programmable gain and other signal conditioning circuitry to distinguish legitimate echoes from noise. It should be pointed out tat there are many techniques practiced in connection with the receiver circuitry of present sonar systems to improve the performance of such systems. By way of example and not limitation, such techniques include: time variable gain to compensate for attenuation of the acoustic pulse and its echoes over distance; the use of digital signal processing techniques to implement digital filtering; and the like. The incorporation of such techniques into the receiver circuitry of the inventive sonar transducer is well within the skill level of one of ordinary skill in the art.

Computing device 40 is preferably a microprocessor or digital signal processor. If digital signal processing techniques are employed in sonar transducer 32, then all of the processing operations of sonar transducer 32 would preferably be performed by within a digital signal processor. Typically, computing device 40 will receive commands from sonar unit 30 to; set the power level of transmitter 36; set the sonar pulse duration; set the sonar pulse interval in an auto-firing mode, or to fire a sonar pulse in a triggered mode; set the receiver gain; set parameters of time varying gain; set filter parameters; and the like. Upon firing a sonar pulse, computing device 40 will process received echoes in the same manner as do present-day sonar units and transmit echo information to sonar unit 30. Computing device 40 includes an interface, typically an asynchronous serial interface, for communication with other devices of the sonar system.

Sonar units are well known in the art and display unit 30 is preferably typical of sonar units presently used in recreational boating and fishing. However, display unit 30 is configured to digitally send transmit information, i.e., power, pulse width, repetition rate, etc., to transducer 32 through interface 42 and digitally receive echo information through interface 42. Thus the signals sent to, and received from, transducer 32 are digital in nature and not particularly subject to interference. This, of course, is in contrast to traditional sonar units which must send a high power, modulated pulse to an acoustic transducer and then "listen" for echo signals received by the acoustic transducer. As noted above, such echo signals are relatively low level and susceptible to interference from other systems on the boat when sent through a cable from the acoustic transducer to the sonar unit.

It should be noted that, since the transmitter and receiver circuitry of the inventive transducer 32 are essentially the same as that incorporated in prior art sonar systems, the signal provided to display unit 30 by transducer 32 essentially represents the same data that a conventional sonar unit would internally derive from processing received echoes from its acoustic traducer. Thus, display unit 30 could optionally include traditional transmitter and receiver circuitry (not shown) for use with a conventional sonar transducer as well as providing the digital interface 42 for communicating with the inventive digital sonar transducer 32.

Many advantages of the present sonar system will be apparent to those familiar with recreational sonar systems. For example, with both the transmitter 36 and acoustic transducer 34 located external to display unit 30, display 30 can be used at virtually any sonar frequency. Thus, a fisherman could have a variety of transducers configured for use at different frequencies so that several system could operate simultaneously from a single boat without interference among the various units, or a fisherman may select a frequency best suited for a particular fishing environment. It should also be apparent that, since the echoes are amplified within very close proximity to the acoustic transducer, concerns over electromagnetic interference are virtually eliminated. Furthermore, since the analog circuitry of transducer 10 is self-contained, concerns over ground loops or ground noise are, likewise, virtually eliminated.

Figure 2:
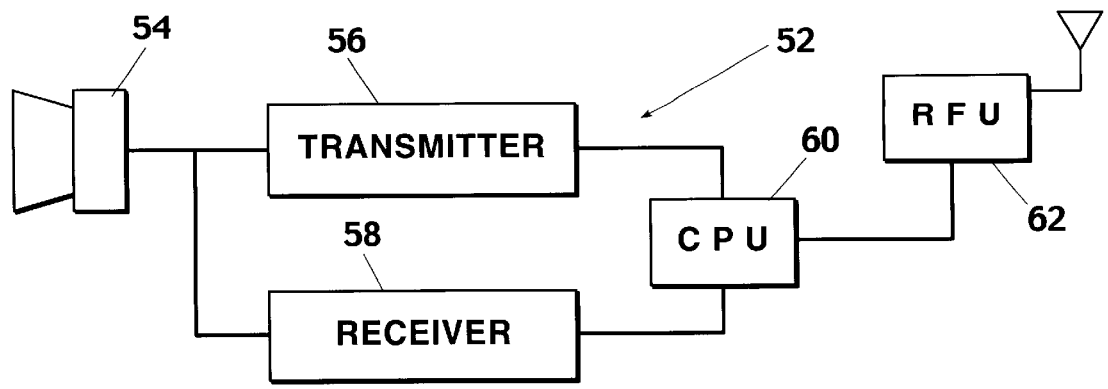
FIG. 2 provides a block diagram of the inventive digital sonar transducer in a wireless embodiment.
Figure 3:
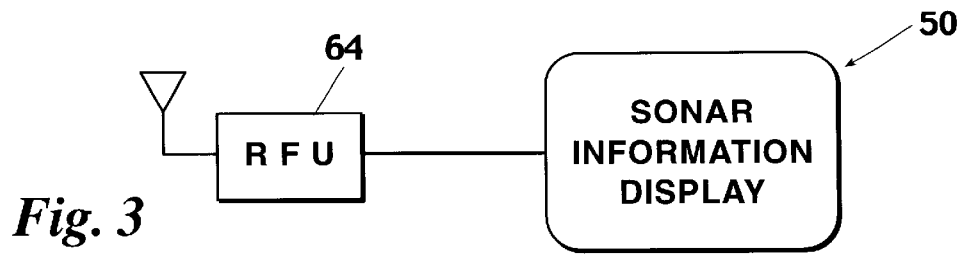
FIG. 3 provides a block diagram of a wireless sonar unit for use with the digital sonar transducer.

In another preferred embodiment, as shown in FIGS. 2 and 3, a digital sonar transducer 52 is configured for wireless communication with display unit 50. As with the previously described embodiment, transducer 52 includes: acoustic transducer 54; transmitter circuitry 56; receiver circuitry 58; and computing device 60. In addition, however, transducer 52 also includes a wireless transceiver 62 for communication with transceiver 64 of display 50. Wireless communication systems are well known in the art and may include, by way of example and not limitation: radio frequency units, as shown for transceivers 62 and 64; infrared communication systems; and the like. Operation of transducer 52 and display 50 is identical to that of transducer 32 and sonar unit 30 except that communication occurs wirelessly.

As will be apparent to those skilled in the art, the wireless system offers a number of additional advantages. For example: if the digital sonar transducer 52 is powered by an internal battery, there is no need to route any wires to the transducer, eliminating wiring concerns; a single sonar transducer 52 could readily provide sonar information to several displays throughout the boat; and, with the elimination of external wiring, problems associated with electromagnetic interference, ground noise, and the like, become virtually non-existent.

It should noted that radio frequencies suitable for the transmission of digital signals at the throughput required for a wireless sonar transducer are, generally speaking, not well suited for transmission through water. Accordingly, in a wireless embodiment, it is preferable to provide a transducer, mountable below the waterline, which is connected to circuitry mountable above the waterline or in the boat. It should be noted that, while the above-water location is most preferable for the antenna for wireless communication, other circuitry such as the receiver and transmitter, could be located either at the transducer or in the un-submerged location. Despite the fact that some wiring may still be involved with the wireless transducer, nonetheless, such a device will interface to any number of display devices, facilitates using multiple transducers at different frequencies to adapt to varying environments, and the wiring is far simpler than the wiring of a conventional transducer.

As will be apparent to those skilled in the art, a number of modifications could be made to the preferred embodiments which would not depart from the spirit or the scope of the present invention. By way of example and not limitation, the sonar transducer could be configured to operate in a simplex fashion in that sonar pulses would be automatically produced by the transducer, without prompting from the sonar unit, and the precessed echo information would automatically be sent to any device connected to the interface, or, multiple transducer could be configured to fire in a synchronized fashion so that multiple transducers operating at a single frequency would not interfere among themselves.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. A sonar transducer comprising:
   a housing;
   an acoustic transducer;
   a transmitter for electrically driving said acoustic transducer;
   a receiver for amplifying and conditioning sonic echoes received by said acoustic transducer; and
   an interface for bi-directional communication with a display unit, wherein said acoustic transducer, said transmitter, said receiver, and said interface for bi-directional communication are housed within said housing.

2. The sonar transducer of claim 1 wherein said interface comprises a wireless transceiver.

3. The sonar transducer of claim 2 wherein said wireless transceiver is a radio frequency unit.

4. A sonar system for recreational boating and fishing comprising:
- a display unit having a first interface for bi-directional digital communication with a sonar transducer and a display for providing information to a user; and
- a sonar transducer comprising:
  - an acoustic transducer;
  - a transmitter for electrically driving said acoustic transducer;
  - receiver for processing sonic echoes received by said acoustic transducer; and
  - a second interface for bi-directional digital communication with said display unit.

5. The sonar system of claim 4 wherein said first interface and said second interface communicate wirelessly.

6. The sonar system of claim 5 wherein said first interface and said second interface communicate via radio frequency.

7. A sonar transducer comprising:
- an acoustic element;
- a transmitter for electrically driving said acoustic element, said transmitter controllable to produce a specific sonar pulse;
- a receiver for amplifying echoes received by said acoustic transducer, said receiver having an output;
- a computing device for controlling the sonar pulse produced by said transmitter and for processing the signal provided at said output;
- an interface for bi-directional digital communication with a display unit, said transmitter, said receiver, and said computing device being external to the display unit.

* * * * *